United States Patent
Lu et al.

(10) Patent No.: US 12,251,017 B2
(45) Date of Patent: Mar. 18, 2025

(54) LIFTING MECHANISM AND LIFTING TABLE

(71) Applicant: QIDONG VISION MOUNTS MANUFACTURING CO., LTD., Jiangsu (CN)

(72) Inventors: Hairong Lu, Jiangsu (CN); Chaojie Huang, Jiangsu (CN); Haobo Cai, Jiangsu (CN)

(73) Assignee: QIDONG VISION MOUNTS MANUFACTURING CO., LTD., Jiangsu (CN)

( * ) Notice: Subject to any disclaimer, the term of this patent is extended or adjusted under 35 U.S.C. 154(b) by 90 days.

(21) Appl. No.: 18/214,728

(22) Filed: Jun. 27, 2023

(65) Prior Publication Data
US 2023/0337814 A1    Oct. 26, 2023

Related U.S. Application Data
(63) Continuation of application No. PCT/CN2022/132400, filed on Nov. 17, 2022.

(30) Foreign Application Priority Data

Apr. 22, 2022  (CN) .......................... 202210431029.X

(51) Int. Cl.
*A47B 9/16* (2006.01)
*A47B 97/00* (2006.01)
(Continued)

(52) U.S. Cl.
CPC ................ *A47B 9/16* (2013.01); *A47B 97/00* (2013.01); *G06T 7/70* (2017.01);
(Continued)

(58) Field of Classification Search
CPC ..... A47B 9/16; A47B 9/10; A47B 2200/0062; A47B 3/02
See application file for complete search history.

(56) References Cited

U.S. PATENT DOCUMENTS 4,718,353 A * 1/1988 Schuller ................... B61D 3/14
                                                              105/406.1
10,092,089 B1 * 10/2018 Yuan ....................... A47B 3/002
(Continued)

FOREIGN PATENT DOCUMENTS

CN    105124920 A    12/2015
CN    107041626 A    8/2017
(Continued)

OTHER PUBLICATIONS

Machine translation of CN 113142799 (Year: 2024).*

*Primary Examiner* — Daniel J Rohrhoff
(74) *Attorney, Agent, or Firm* — SZDC Law PC

(57) ABSTRACT

A lifting mechanism includes: a cross-arm assembly including a first combined arm and a second combined arm arranged in parallel, the first and second combined arms each comprising a first support member and a second support member, the length of the first support member being greater than the length of the second support member; a support connection assembly including a first rotational connection assembly and a first sliding connection assembly fixed to a base, and a second rotational connection assembly and a second sliding connection assembly fixed to the bottom side of a table top, the first and second sliding connection assemblies each comprising a slide rail and a moving member rotatably and slidably arranged in the slide rail; and a driving member connected to the cross-arm assembly and/or the support connection assembly for driving the moving members to change their position on the slide rail.

9 Claims, 11 Drawing Sheets

(51) Int. Cl.
*G06T 7/70* (2017.01)
*G08B 21/24* (2006.01)

(52) U.S. Cl.
CPC ............... *A47B 2200/0056* (2013.01); *A47B 2200/0084* (2013.01); *G06T 2207/30196* (2013.01); *G08B 21/24* (2013.01)

(56) References Cited

U.S. PATENT DOCUMENTS

| | | | | |
|---|---|---|---|---|
| 11,337,516 B1* | 5/2022 | You | ............................ | A47B 9/16 |
| 2018/0146775 A1* | 5/2018 | You | ............................ | A47B 9/16 |
| 2018/0255919 A1* | 9/2018 | Swartz | ...................... | A47B 9/12 |
| 2018/0360208 A1* | 12/2018 | Liao | ........................ | A47B 21/02 |
| 2019/0125073 A1* | 5/2019 | Angelini | ................. | A47B 21/02 |
| 2019/0328128 A1* | 10/2019 | Namala | .................... | A47B 9/20 |
| 2019/0328129 A1* | 10/2019 | Namala | .................... | A47B 9/20 |
| 2022/0295982 A1* | 9/2022 | Zheng | ...................... | A47B 9/10 |
| 2022/0354246 A1* | 11/2022 | Wang | ................. | A47B 21/0314 |
| 2023/0072671 A1* | 3/2023 | Yuan | ........................ | B66F 7/065 |

FOREIGN PATENT DOCUMENTS

| | | | |
|---|---|---|---|
| CN | 107136750 | A | 9/2017 |
| CN | 207444558 | U | 6/2018 |
| CN | 212878225 | U | 4/2021 |
| CN | 113142799 | A | 7/2021 |
| CN | 213757102 | U | 7/2021 |
| CN | 114698928 | A | 7/2022 |
| TW | M515821 | U | 1/2016 |

\* cited by examiner

LIFTING MECHANISM AND LIFTING TABLE

This application is a Continuation Application of PCT/CN2022/132400, filed on Nov. 17, 2022, which claims priority to Chinese Patent Application No. 202210431029.X, filed on Apr. 22, 2022, which is incorporated by reference for all purposes as if fully set forth herein.

TECHNICAL FIELD

The present invention relates to the technical field of height-adjustable desks, in particular to a lifting mechanism and a lifting desk.

BACKGROUND

For commonly used desks, users can only sit and work at a fixed height. However, due to the physical differences of computer users, the display screen cannot be guaranteed to be always at a comfortable height. If the user works for a prolonged time at an uncomfortable height, it may cause spinal diseases. For sake of health, lifting desks with vertically adjustable height are gradually being used in the office. In the related technology, the lifting mechanism of the lifting desk mostly adopts a scissor-type structure, which changes the included angle between the scissor-type support sides through a driving member to change the support height. However, as scissor-type products become more and more mature, their structural forms gradually tend to be unified, and it is difficult to further reduce the product price and cost.

The information disclosed in this background section is only intended to deepen the understanding of the overall background of the present invention, and should not be regarded as an acknowledgment or any form of suggestion that the information constitutes the prior art known to those skilled in the art.

SUMMARY

The technical problem to be solved by the present invention is to provide a lifting mechanism and lifting desk, which offers another structural form of lifting and reduces the cost of the product.

To this end, the present invention adopts technical solutions described below.

In a first aspect, the present invention provides a lifting mechanism comprising:

a cross-arm assembly comprising a first combined arm and a second combined arm arranged in parallel, the first and second combined arms each comprising a first support member and a second support member, the length of the first support member being greater than the length of the second support member, and one end of the second support member being hinged on the first support member, the free ends of the first and second combined arms forming four groups of support points;

a support connection assembly comprising a first rotational connection assembly and a first sliding connection assembly fixed to a base, and a second rotational connection assembly and a second sliding connection assembly fixed to the bottom side of a table top, the first and second sliding connection assemblies each comprising a slide rail and a moving member rotatably and slidably arranged in the slide rail, the four groups of support points formed by the free ends of the first and second combined arms being rotatably connected to the first rotational connection assembly, the second rotational connection assembly, and the two moving members, respectively; and a driving member connected to the cross-arm assembly and/or the support connection assembly for driving the moving members to change their position on the slide rail;

wherein the four groups of support points formed by the free ends of the first and second combined arms form a parallelogram, the first and second sliding connection assemblies being provided on the same side, and when the position of the moving members within the slide rail is changed, the side lengths of the parallelogram are changed to adjust the distance between the table top and the base.

Further, the driving member is connected at one end to one of the moving members and at the other end to one of the first support members at a non-hinge point.

Further, the driving member is connected at one end to one of the moving members and at the other end to one of the second support members at a non-hinge point.

Further, the driving member is connected at one end to one of the moving members and at the other end to the first rotational connection assembly or the second rotational connection assembly.

Further, the two first support members are crossed and the four free ends of the two first support members are connected to the first rotational connection assembly, the first sliding connection assembly, the second rotational connection assembly and the second sliding connection assembly, respectively;

wherein the two second support members are connected to the first rotational connection assembly and the first sliding connection assembly, respectively.

Further, the two first support members are crossed and the four free ends of the two first support members are connected to the first rotational connection assembly, the first sliding connection assembly, the second rotational connection assembly and the second sliding connection assembly, respectively;

wherein the two second support members are connected to the second rotational connection assembly and the second sliding connection assembly, respectively.

Further, the two first support members are crossed and the four free ends of the two first support members are connected to the first rotational connection assembly, the first sliding connection assembly, the second rotational connection assembly and the second sliding connection assembly, respectively;

wherein the two second support members are connected to the first sliding connection assembly and the second sliding connection assembly, respectively.

Further, the first and second rotational connection assemblies each comprise a connecting spindle, to which the first and second support members are fixedly connected to form a frame structure.

Further, the support connection assembly is a rectangular frame, the first rotational connection assembly is a circular slot provided in the inner wall of the rectangular frame, the first sliding connection assembly is a rectangular slot provided in the inner wall of the rectangular frame, the rectangular slot forming the slide rail, the moving members being retractable at both ends for extending into the rectangular slot.

In a second aspect, the present invention provides a lifting desk comprising:

a lifting mechanism as described in the first aspect;
a table top connected on the bottom side to the second rotational connection assembly and the second sliding connection assembly of the lifting mechanism; and
a base connected to the first rotating connecting assembly and the first sliding connecting assembly of the lifting mechanism;
wherein the table top is rotatably provided with a handle on the side thereof, the handle being connected to the driving member for controlling the lifting mechanism.

Further, the table top is also provided with an imaging device, a controller electrically connected to the imaging device, and a reminder electrically connected to the controller;
wherein the imaging device is arranged towards the standing/sitting side of the human body for capturing the posture of the human body and transmitting it to the controller, which determines whether the human body is in a sitting posture by analyzing the captured video image; and
wherein the controller is provided with a timer and is configured to start the timer to count when the controller determines that the human body is in the sitting posture and to control the reminder to issue a sedentary reminder when the timer reaches a set time.

The present invention is advantageous in that by changing the traditional scissor-type support structure into a Y-shaped structure with a long side and a short side hinged together, compared with the prior art, the present invention makes the structure simpler and omits at least one short side, saving materials and reducing costs. In addition, compared with the traditional scissor-type support structure, it increases the storage space under the table top, improving the practicality of the lifting desk.

DESCRIPTION OF THE DRAWINGS

In order to more clearly illustrate the embodiments of the present invention or the technical solutions in the prior art, the accompanying drawings to be used in the description of the embodiments or prior art will be briefly described below. It is obvious that the accompanying drawings in the following description are only some of the embodiments recorded in the present invention, and other accompanying drawings can be obtained according to these accompanying drawings without creative work for those of ordinary skill in the art.

DESCRIPTION OF THE EMBODIMENTS

The technical solutions in the embodiments of the present invention will be described clearly and completely in conjunction with the accompanying drawings in the embodiments of the present invention. Obviously, the described embodiments are only a portion of the embodiments of the present invention, rather than all the embodiments.

It should be noted that when an element is referred to as being "fixed to" another element, it can be directly on another element or an intermediate element may also be present. It should be noted that when an element is referred to as being "connected to" another element, it can be directly on another element or an intermediate element may also be present. The terms "vertical", "horizontal", "left", "right" and similar expressions used herein are for illustrative purposes only and do not mean that they are the only mode of implementation.

Unless otherwise defined, all technical and scientific terms used herein have the same meaning as commonly understood by those skilled in the art of the present invention. The terms used herein are for the purpose of describing specific embodiments only and are not intended to limit the invention. The term "and/or" as used herein includes any and all combinations of one or more of the related listed items.

The core inventive concept of the invention is that it changes the existing crossed scissor-type support to a Y-type support including a long side and a short side. Compared with the prior art, the structure of this type of support is simpler, which not only saves material but also offers more abundant storage space under the table top, improving the practicality of the lift table. The following is a detailed description of the embodiments based on the above inventive concept. The following description is merely an introduction of the embodiments that meet the concept of the invention, and is not intended to limit them. That is, other embodiments that meet the above inventive concept are also included in the scope of protection of the invention.

Embodiment 1

Figure 1:
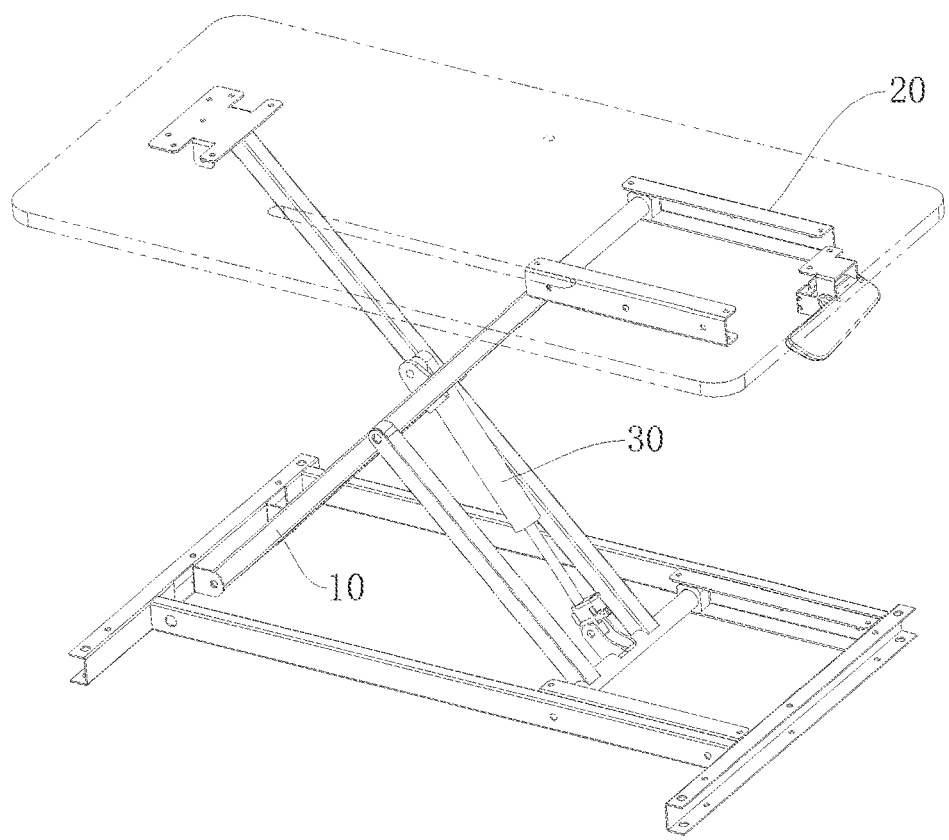
FIG. 1 is a structural schematic diagram of the lifting mechanism according to Embodiment 1 of the present invention.

The lifting mechanism, as shown in FIG. 1, comprises a cross-arm assembly 10, a support connection assembly 20, and a driving member 30.

Figure 2:
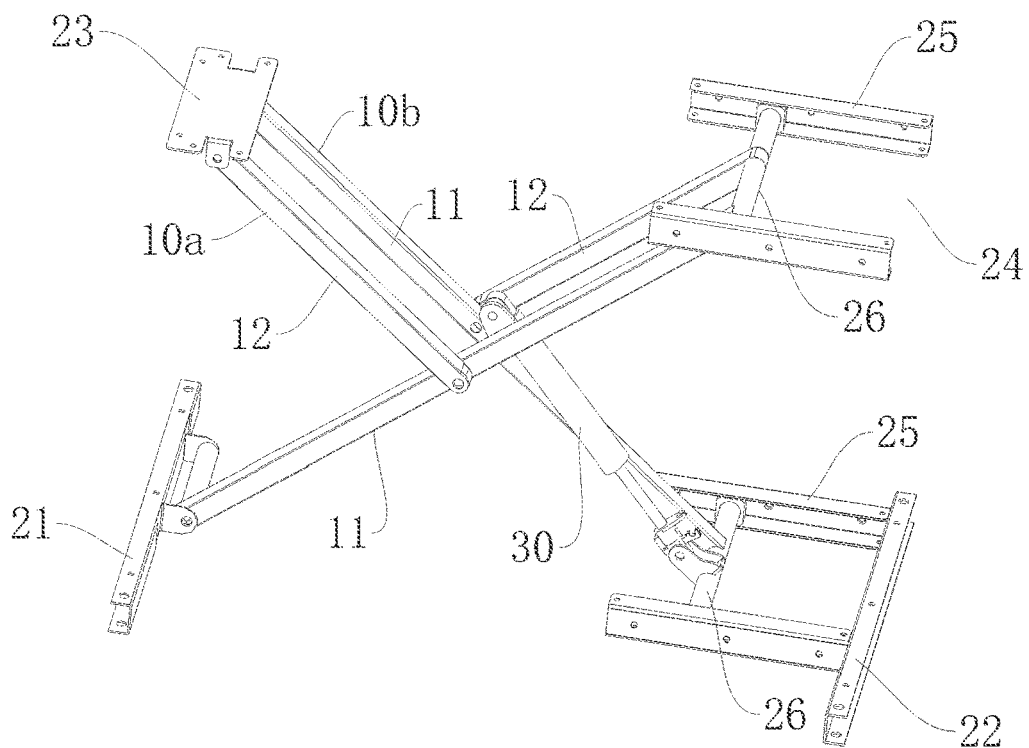
FIG. 2 is a schematic structural diagram of the lifting mechanism according to an embodiment of the present invention.

As shown in FIG. 2, the cross-arm assembly 10 comprises a first combined arm 10a and a second combined arm 10b arranged in parallel, where the parallel arrangement means that the planes where the cross-arms are located are parallel to each other. The first combined arm 10a and the second combined arm 10b each include a first support member 11 and a second support member 12. The length of the first support member 11 is greater than the length of the second support member 12, and one end of the second support member 12 is hinged on the first support member 11. Of course, it should be noted here that the first support member 11 and the second support member 12 may be a rod with a rectangular or circular cross-section made of profile. The end of the second support member 12 may be hinged to the side of the first support member 11, or the end of the second support member 12 may also be slightly protruding from the middle of the first support member 11. The free ends of the first combined arm 10a and the second combined arm 10b form four groups of support points. In this embodiment, the arrangement of the first combined arm 10a and the second combined arm 10b has various forms. In order to ensure the stability of the support, the first support members 11 of the first combined arm 10a and the second combined arm 10b are arranged crosswise, while the second support members 12 of the first combined arm 10a and the second combined arm 10b may support in various directions, which will be described in detail below.

The support connection assembly 20 comprises a first rotational connection assembly 21 and a first sliding connection assembly 22 fixed to a base, and a second rotational connection assembly 23 and a second sliding connection assembly 24 fixed to the bottom side of a table top. One side of the rotational connection assembly is fixed to the bottom side of the table top and is connected to the free end of the first support member 11 or the second support member 12 in a hinged manner, thereby achieving a change in angle between the first support member 11 and the second support member 12.

The first sliding connection assembly 22 and the second sliding connection assembly 24 each comprise a slide rail 25 and a moving member 26 rotatably and slidably arranged within the slide rail 25. The rotatable sliding can be achieved by providing a slider in the slide rail 25 and rotationally connecting the two ends of the moving member 26 to the slider, which not only satisfies the connection of the first support member 11 and the second support member 12 to the moving member 26, but also realizes the change in the angle between the first support member 11 and the second support member 12 when the moving member 26 moves in the slide rail 25.

The four groups of support points formed by the free ends of the first combined arm 10a and the second combined arm 10b are rotatably connected to the first rotational connection assembly 21, the second rotational connection assembly 23 and the two moving members 26, respectively. In this way, because the first support member 11 and the second support member 12 are hinged in the middle, the angle between the first support member 11 and the second support member 12 changes when the position of the moving member 26 in the slide rail 25 is changed, thus changing the distance between the table top and the base and finally realizing the adjustment of the height of the table top.

Figure 3:
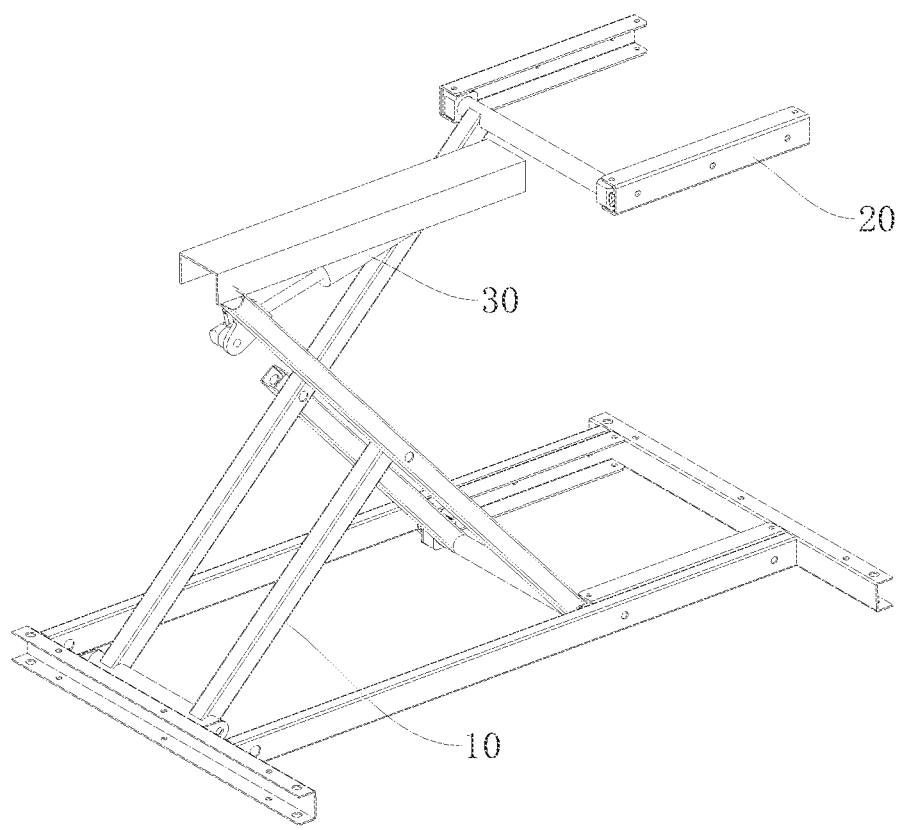
FIG. 3 is a schematic structural diagram of a fixing form of driving members in Embodiment 1 of the present invention.

The driving member 30 is connected to the cross-arm assembly 10 and/or the support connection assembly 20 for driving the moving members 26 to change their position on the slide rail 25. It should be noted here that the driving member 30 may be implemented in a variety of forms. For example, it may be implemented as a pneumatic or hydraulic cylinder drive, or may be implemented through coordination between a screw rod and a slider, in which case the screw rod is driven by a motor to rotate to adjust the position of the slider, and the adjustment of the height of the table top can be achieved whether the slider is rotatably fixed to the support connection assembly 20 or the cross-arm assembly 10. Alternatively, it may be implemented by fixing a gear on the output shaft of the motor and fixing a rack in the direction of movement, whereby power output can be achieved by cooperation of the gear and rack, or it may also be implemented as other structures such as a sprocket chain, a synchronous belt and the like. In this embodiment, the driving member 30 is selected as a gas spring. The gas spring may be selected as a nitrogen lockable gas spring, which is simple in structure, small in size and easy to control. It should also be noted here that the driving member 30 may be fixed in various forms. For example, as shown in FIG. 3, the driving member 30 is hinged at one end to the table top and at the other end to one of the support members on the cross-arm assembly 10, or it can be fixed in other forms, which will be described in detail in the following.

The driving principle of the lifting desk is that the four groups of support points formed by the free ends of the first and second combined arms 10a, 10b form a parallelogram, the first and second sliding connection assemblies 22, 24 being provided on the same side, and when the position of the moving members 26 within the slide rail 25 is changed, the side lengths of the parallelogram are changed to adjust the distance between the table top and the base.

According to the embodiment described above, by changing the traditional scissor-type support structure into a Y-shaped structure with a long side and a short side hinged together, compared with the prior art, the present invention makes the structure simpler and omits at least one short side, saving materials and reducing costs. In addition, compared with the traditional scissor-type support structure, it increases the storage space under the table top, improving the practicality of the lifting desk.

Embodiment 2

In the following several embodiments of the present invention, the arrangement of the driving member 30 will be described. It should be noted here that only one driving member 30 may be provided, or more than one driving member 30 may be provided as required.

Figure 4:
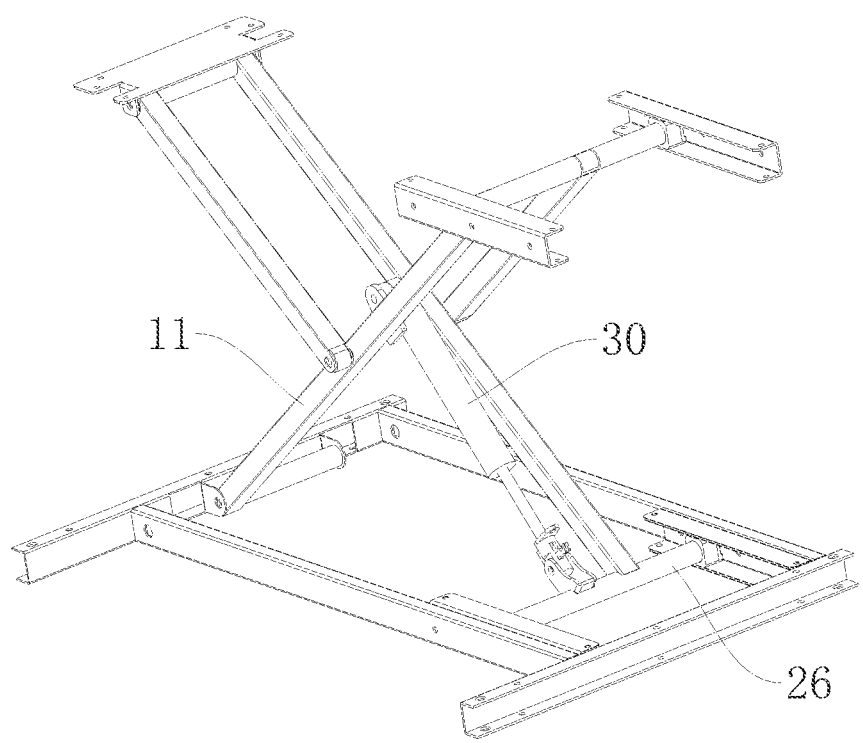
FIG. 4 is a schematic structural diagram of the arrangement of the driving mechanism in Embodiment 2 of the present invention.
Figure 5:
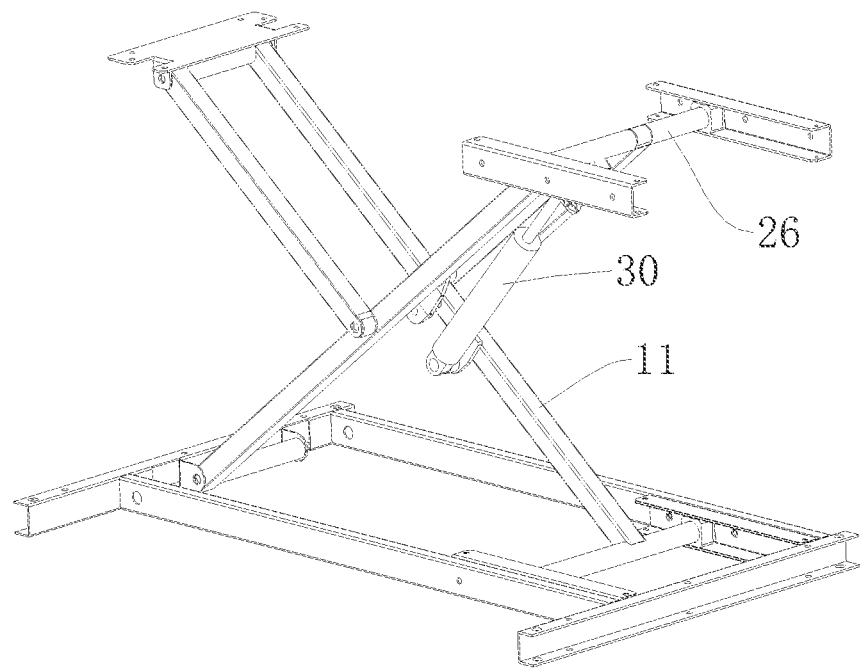
FIG. 5 is a schematic structural diagram of another arrangement of the driving members in Embodiment 2 of the present invention.

As shown in FIG. 4, in this embodiment, the driving member 30 is connected at one end to one of the moving members 26 and at the other end to one of the first support members 11 at a non-hinge point. The connection here refers to a rotatable connection, because as the driving member 30 drives the first support member 11 to change the angle with respect to the second support member 12, the position of connection with the driving member 30 also changes. By providing the connection as a rotatable connection, it is possible to make the driving member 30 adapt to the change in position to apply force continuously. Of course, the moving member 26 here may refer to the moving member 26 in the first sliding connection assembly 22 connected to the base, or to the moving member 26 on the second sliding connection assembly 24 connected to the table top as shown in FIG. 5. The first support member 11 connected to the other end of the driving member 30 refers to another first support member 11 not connected to the moving member 26 connected to the driving member 30, so as to ensure that the force can be applied to change the angle of the first support member 11. In this embodiment, the direction of both ends of the driving member 30 is not limited and it can adopt the driving form as shown in FIG. 4 or FIG. 5, or the two ends of the driving member 30 can also be swapped to meet the driving form.

Embodiment 3

Figure 6:
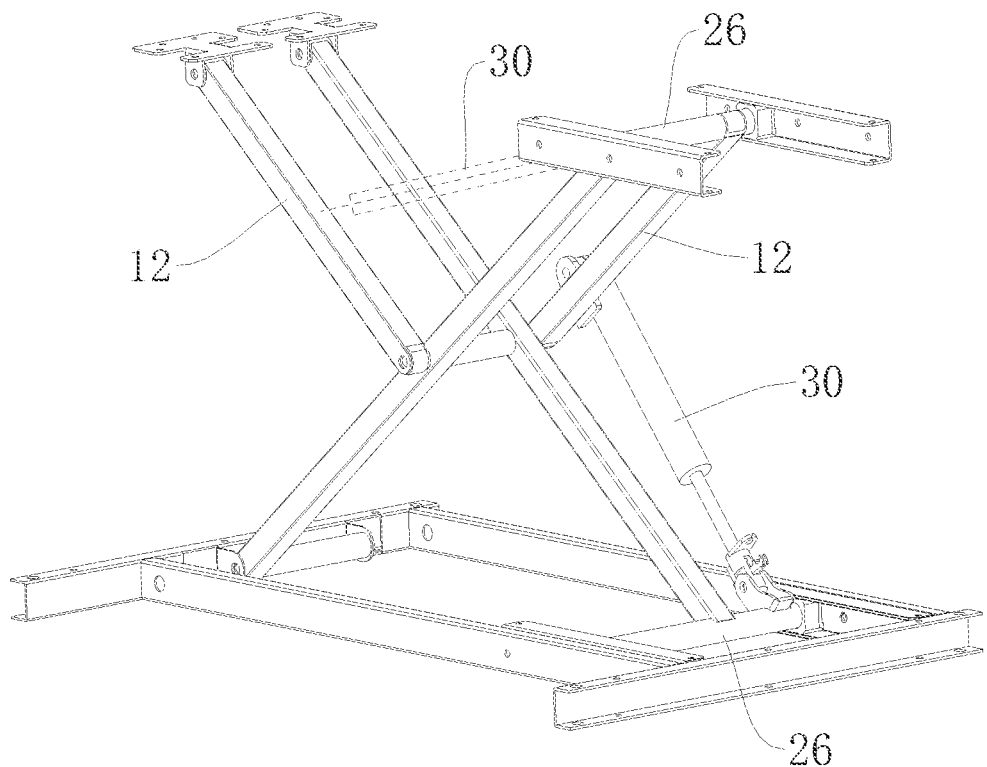
FIG. 6 is a schematic structural diagram of the arrangement of the driving member in Embodiment 3 of the present invention.

As shown in FIG. 6, the driving member 30 is connected at one end to one of the moving members 26 and at the other end to one of the second support members 12 at a non-hinge point. The non-hinge point here and above refers to the hinge point other than the hinge point between the first support member 11 and the second support member 12 and the hinge point between the first support member 11, the second support member 12 and the support connection assembly 20. Likewise, the moving member 26 here may be the moving member 26 in the first sliding connection assembly 22 in FIG. 6, or it may be another moving member 26 connected to the second support member 12 shown in dotted line in FIG. 6.

Figure 7:
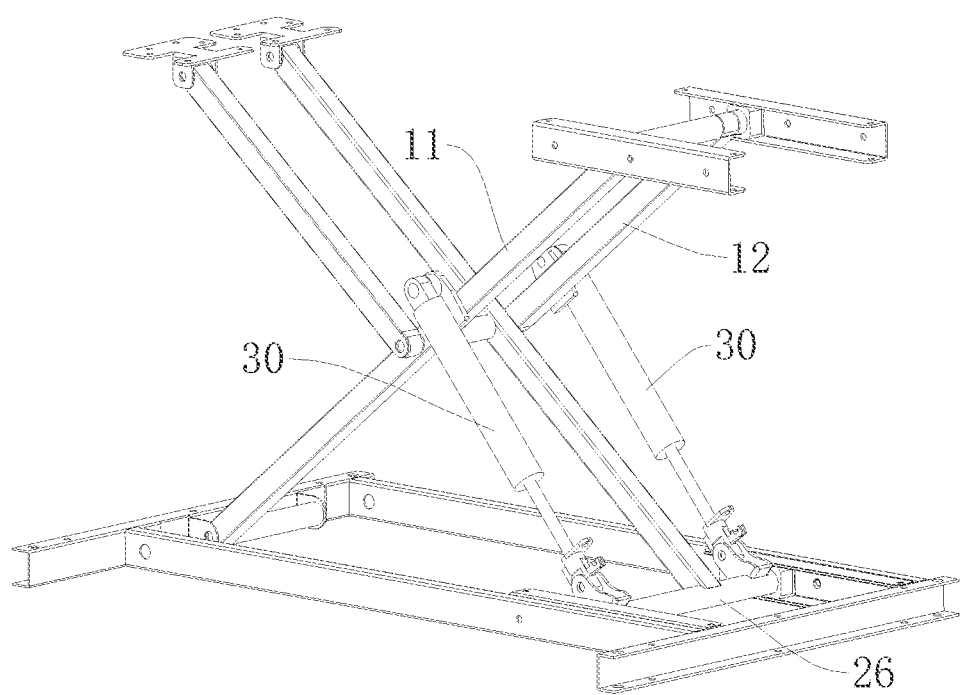
FIG. 7 is a schematic structural diagram of the combination of two driving members in Embodiment 3 of the present invention.

In addition, noted that the driving member 30 of the present invention can also appear in a combination of the above two situations. As shown in FIG. 7, the two driving members 30 is connected one end to a moving member 26, and at the other end to the non-hinge point of the first support member 11 and the second support member 12 that are not connected to the moving member 26. Of course, it should also be pointed out here that the two driving members 30 can also be connected to different moving members 26 respectively, and then be connected to the first support member 11 or the second support member 12 that is not connected to the moving member 26. The above connection forms fall within the protection scope of the present invention.

Embodiment 4

Figure 8:
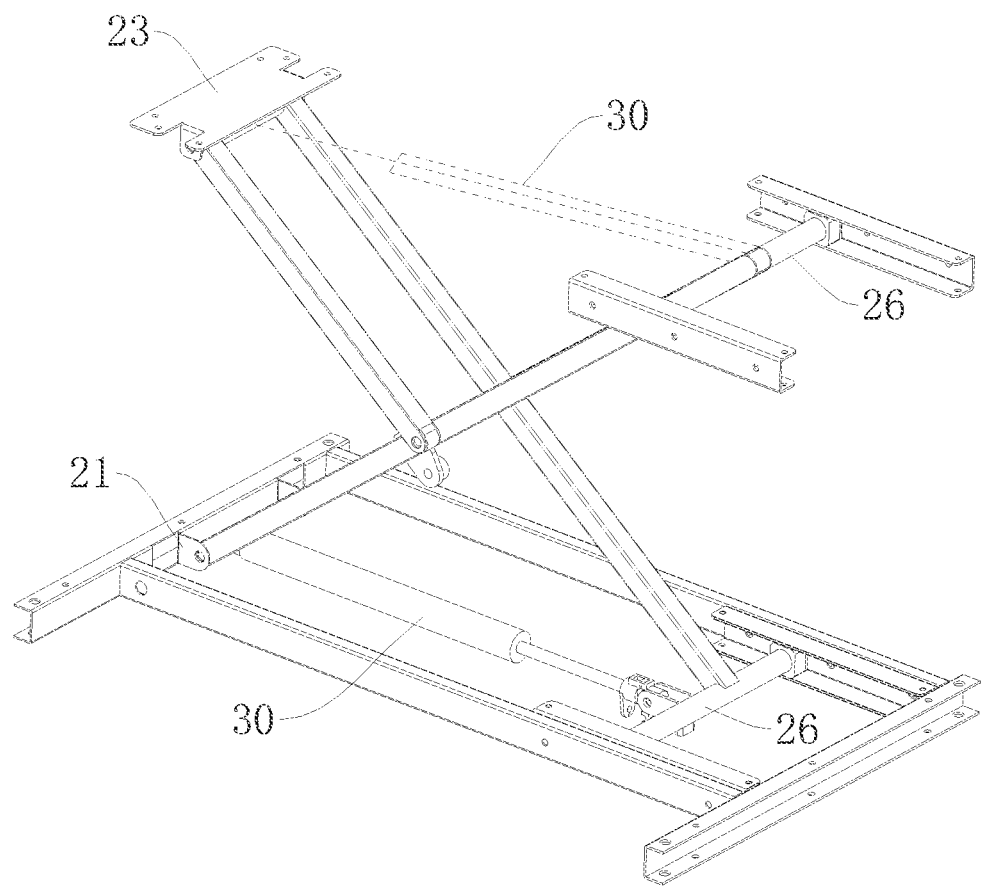
FIG. 8 is a schematic structural diagram of the horizontally arranged driving members according to Embodiment 4 of the present invention.

As shown in FIG. 8, the driving member 30 can also be arranged horizontally, with one end connected to a moving member 26 and the other end connected to the first rotational connection assembly 21 or the second rotating connecting assembly 23. The connection here also refers to a rotatable connection. The driving member 30 can be arranged at the bottom, or at the top shown by the dotted line in FIG. 8. The angle of the moving member 26 changes during the moving process. In the embodiment of the present invention, when the driving member 30 is connected to the moving member 26 or the first rotational connection assembly 21 and the second rotational connection assembly 23, the connection is realized in a hinged manner, so as to realize the change of the angle between the first support member 11 and the second support member 12.

The various arrangement forms of the driving member 30 described above may be selected and combined according to needs, so as to achieve smoother and more stable adjustment and more convenient connection.

Embodiment 5

Figure 9:
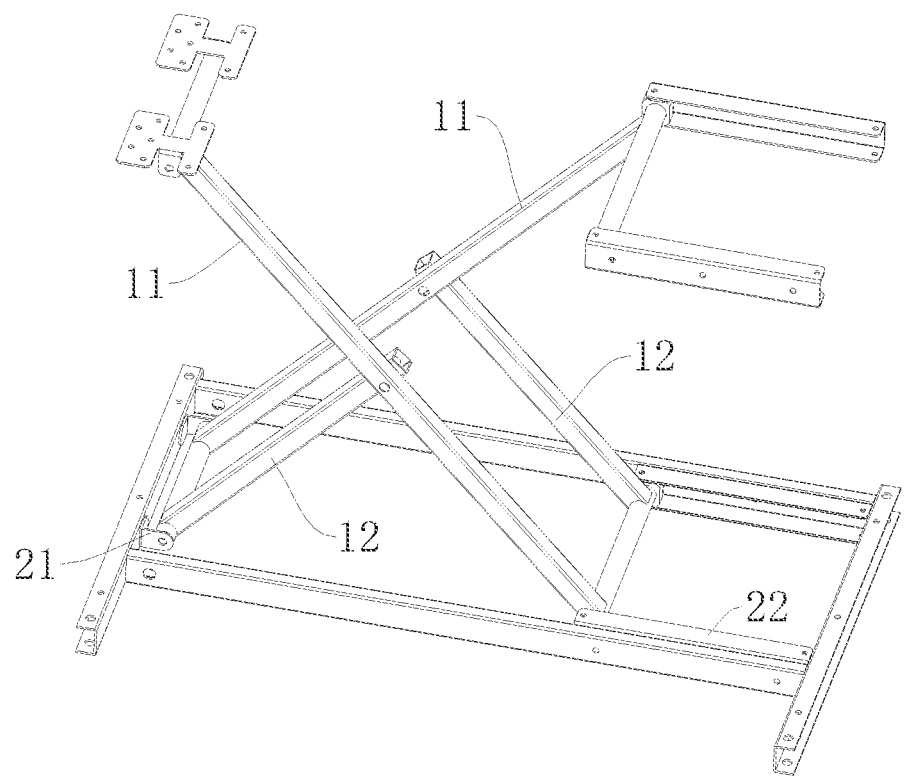
FIG. 9 is a schematic structural view of the cross-arm assembly in the inverted Y arrangement according to Embodiment 5 of the present invention.

The arrangement of the first combined arm 10a and the second combined arm 10b will be introduced in the following embodiments. In this embodiment of the present invention, the arrangement forms of the first combined arm 10a and the second combined arm 10b are classified into three types: inverted Y type, normal Y type, and normal Y and inverted Y type. For example, shown in FIG. 9 is an inverted Y type arrangement, in which two first support members 11 are arranged crosswise, and the four free ends of the two first support members 11 are connected to the first rotational connection assembly 21, the first sliding connection assembly 22, the second rotational connection component 23, and the second sliding connection component 24, respectively. It should be noted here that the cross arrangement of the first support members 11 means that the two first support members 11 cross in an X shape in the direction of the front view. The two support members may also be connected by a rotating shaft 13 to enhance the fixing strength, or they may not be connected to save materials.

The two second support members 12 are connected to the first rotational connection assembly 21 and the first sliding connection assembly 22, respectively. Here, the connection to the first sliding connection assembly 22 specifically refers to the connection to the moving member 26 on the first sliding connection assembly 22. With this inverted Y type arrangement, the support strength of the base can be improved, thereby improving the overall support stability.

Embodiment 6

Figure 10:
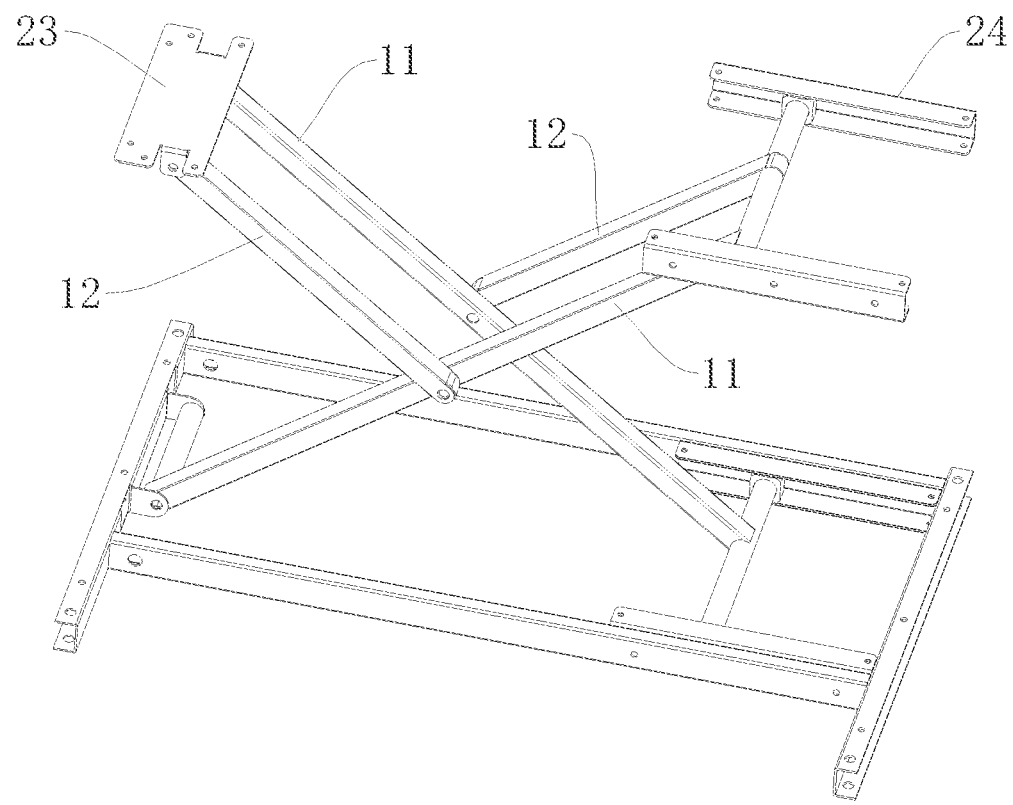
FIG. 10 is a schematic structural view of the cross-arm assembly in the normal Y arrangement according to Embodiment 6 of the present invention.

This embodiment is a normal Y type arrangement. As shown in FIG. 10, the two first support members 11 are crossed and the four free ends of the two first support members 11 are connected to the first rotational connection assembly 21, the first sliding connection assembly 22, the second rotational connection assembly 23 and the second sliding connection assembly 24, respectively. The cross arrangement of the two first support members 11 in this embodiment is the same as above, and will not be repeated here.

The two second support members 12 are connected to the second rotational connection assembly 23 and the second sliding connection assembly 24, respectively. The connection to the second sliding connection assembly 24 here also refers to the connection to the moving member 26 therein, as shown in FIG. 10, at this time, the two second support members 12 support upwards, thereby improving the support strength for the table top. In addition, it should be noted that the second rotational connection assembly 23 in this embodiment of the present invention may be arranged as one-piece as shown in FIG. 10, or may be arranged as separate pieces for independent connection as shown in FIG. 9.

Embodiment 7

Figure 11:
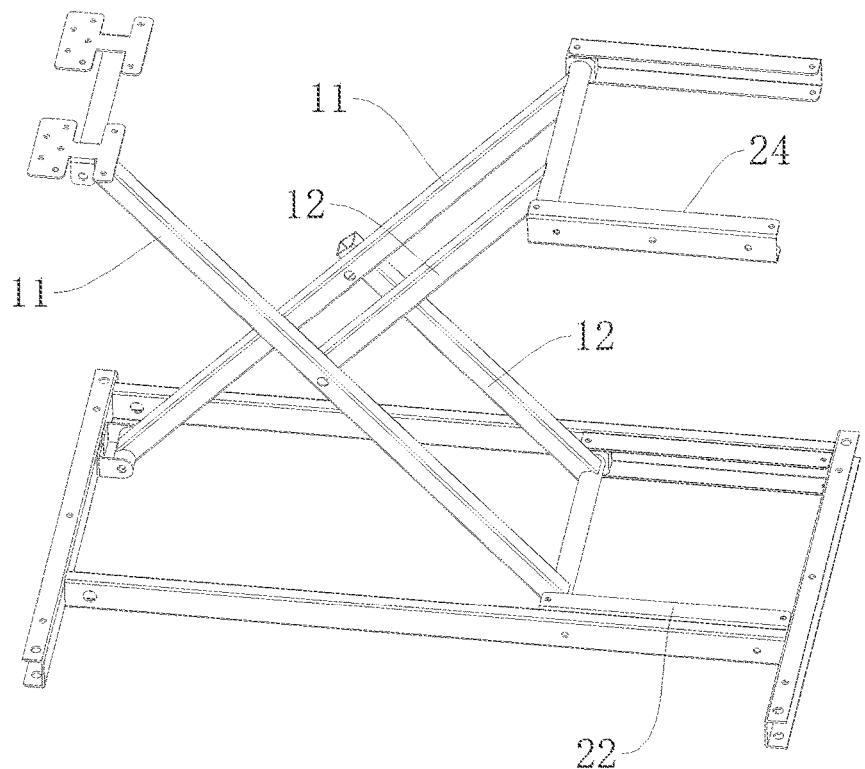
FIG. 11 is a schematic structural view of the cross-arm assembly in the normal Y and inverted Y arrangement of Embodiment 7 of the present invention.

This embodiment is a normal Y and inverted Y type arrangement. As shown in FIG. 11, the two first support members 11 are crossed and the four free ends of the two first support members 11 are connected to the first rotational connection assembly 21, the first sliding connection assembly 22, the second rotational connection assembly 23 and the second sliding connection assembly 24, respectively.

The two second support members 12 are connected to the first sliding connection assembly 22 and the second sliding connection assembly 24, respectively. It is also noted that the connection to the first sliding connection assembly 22 and the second sliding connection assembly 24 refers to the connection to the moving member 26 therein. The above connection form makes the force on the moving member 26 relatively balanced, thereby improving the service life of the slide rail 25 and the moving member 26, and improving the adjustment stability of the device.

Embodiment 8

Figure 12:
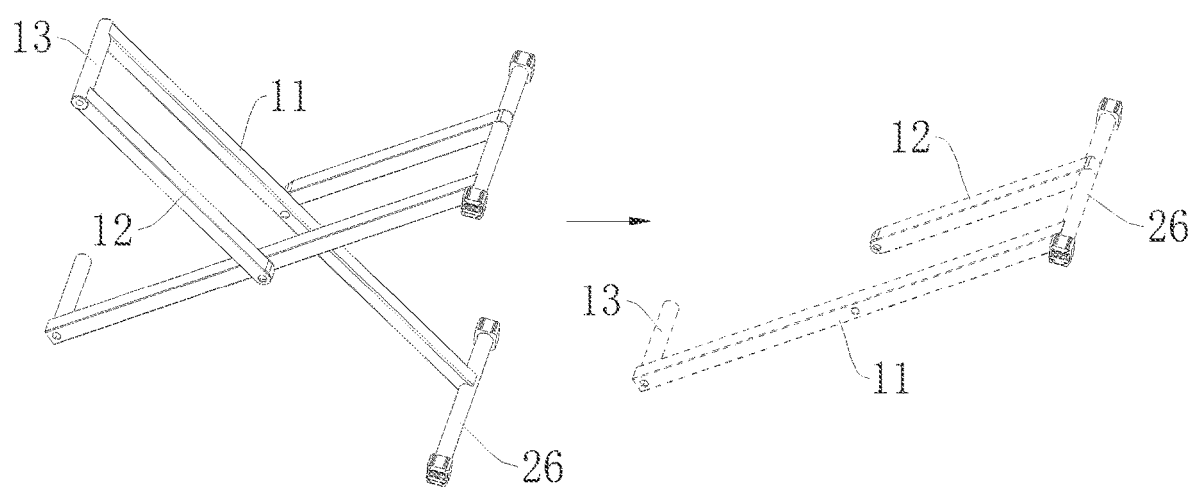
FIG. 12 is a schematic structural diagram of a cross-arm assembly in a frame structure in Embodiment 8 of the present invention.

To further improve the overall strength of the lifting mechanism, in this embodiment, the first and second rotational connection assemblies 21, 23 each comprise a connecting rotating shaft 13, to which the first and second support members 11, 12 are fixedly connected to form a frame structure. As shown in FIG. 12, with the arrangement of the rotating shaft 13, the first support member 11 and the second support member 12, respectively belonging to the two cross-arm assemblies 10, as well as the rotating shaft 13 and the moving member 26 connected thereto, are fixed together to form a frame as a whole. This arrangement makes installation more convenient. Continuing with reference to FIG. 12, the other group of rotating shaft 13, the first support member 11, the moving member 26, and the second support member 12 shown in the dotted line form a second frame. During assembly, the two frames are hinged to form a complete cross-arm assembly 10. Of course, it should be pointed out here that in the embodiment of the present invention, the frame structure is not limited to the above structural forms. When the first rotational connection assembly 21 and the second rotational connection assembly 23 are in an independent connection form, the first support member 11 and the second support member 12 can also be connected to the moving member 26 to form a frame.

Embodiment 9

In the embodiment of the present invention, there is no limitation on the installation form of the cross-arm assembly 10 along the width direction of the table top. In this embodiment, the installation form of the cross-arm assembly 10 is introduced. According to the sequential order in the width direction of the table top, the installation form can be divided into three types: surrounded installation, staggered installation, and independent installation, as shown in FIGS. 13-15.

Figure 13:
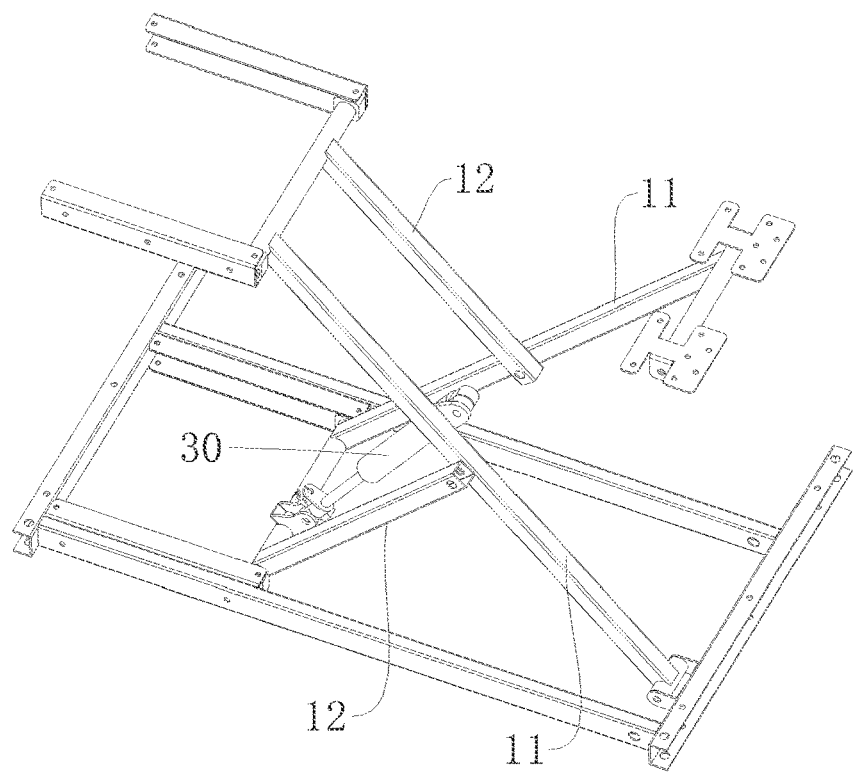
FIG. 13 is a schematic structural view of the surrounded installation form of the cross-arm assembly in Embodiment 9 of the present invention.

As shown in FIG. 13, the outermost first support member 11 and second support member 12 surround the inner first support member 11 and second support member 12 on their inner sides, and then are connected to the moving member 26 to form an inner frame surrounded by an outer frame. This form of installation makes the driving force balanced and the height adjustment smoother and more stable.

Figure 14:
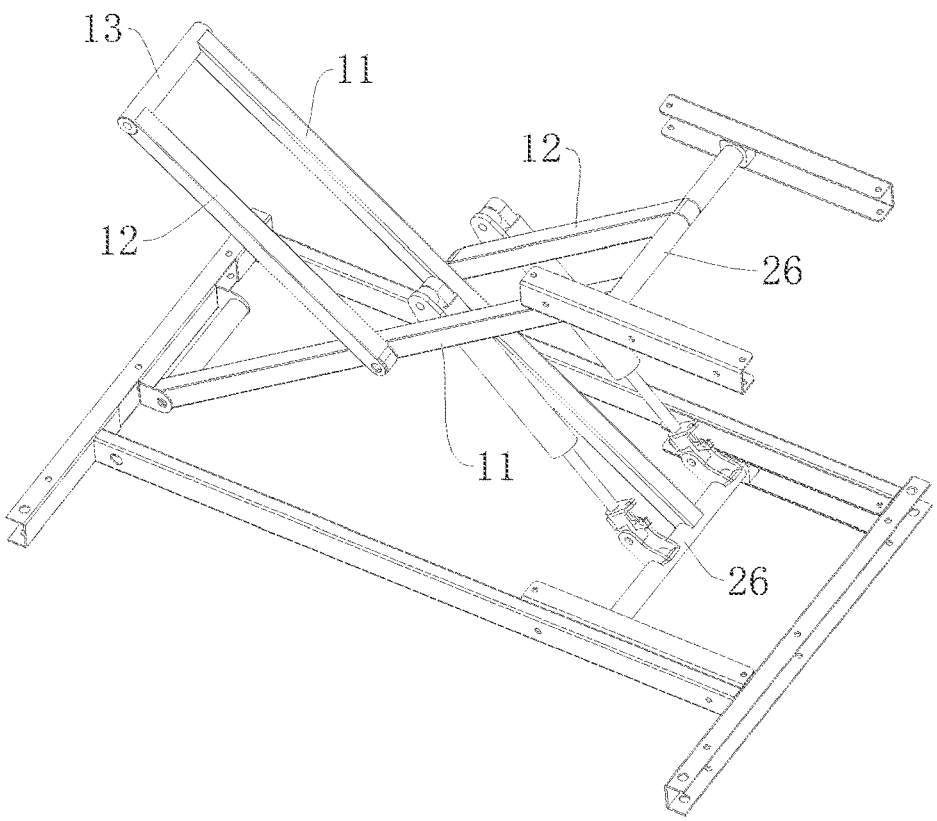
FIG. 14 is a structural schematic diagram of the staggered installation form of the cross-arm assembly in Embodiment 9 of the present invention.

FIG. 14 shows a staggered installation method in the embodiment of the present invention, in which a frame composed of a group of second support member 12, rotating shaft 13 and first support member 11 are installed on the opposite side of another frame, rather than surrounding the other frame. This staggered installation method can apply force at the same position through two driving members 30. This installation method allows the driving members to have less influence on each other in the width direction of the table top during driving, which can reduce the stress between the cross-arm assemblies 10 and improve the durability of the mechanism.

Figure 15:
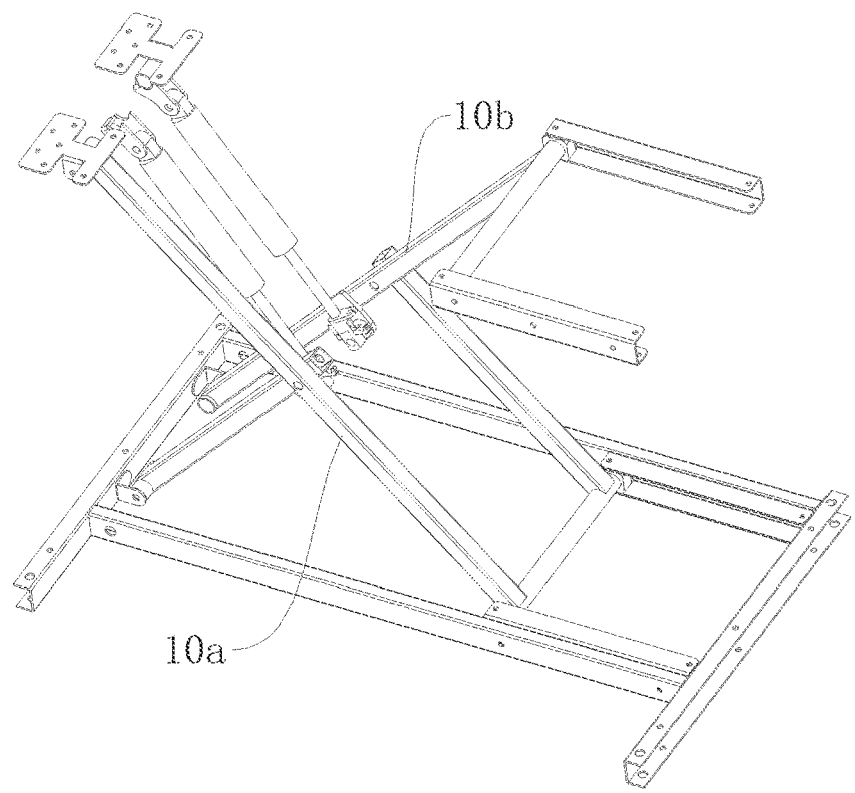
FIG. 15 is a schematic structural diagram of the independent installation form of the cross-arm assembly in Embodiment 9 of the present invention.
Figure 16:
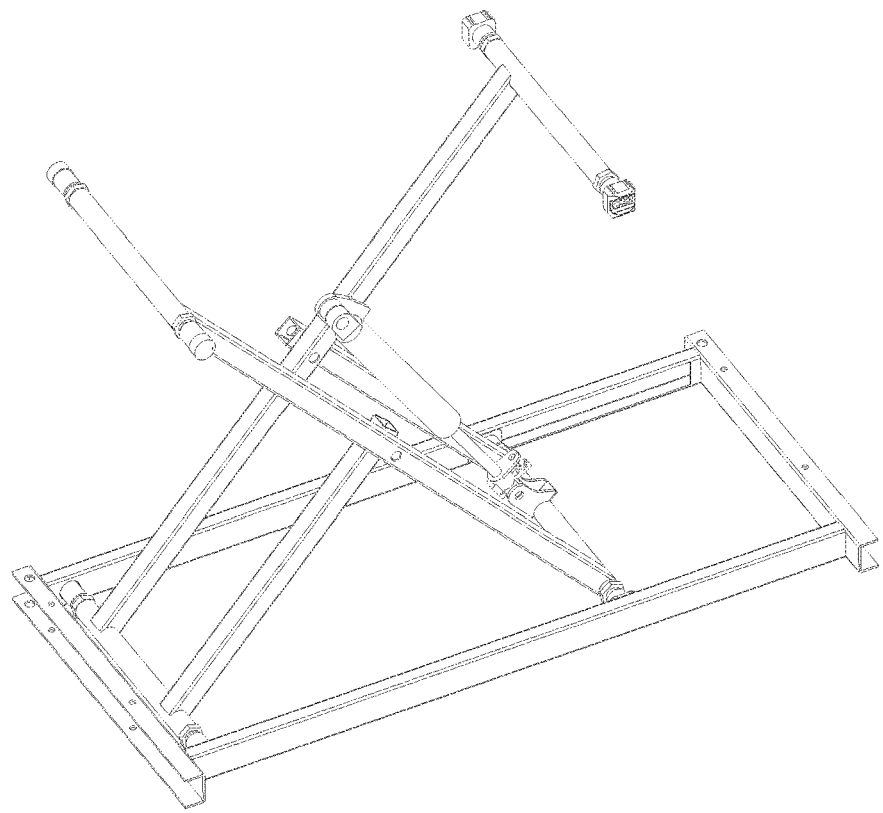
FIG. 16 is a schematic structural diagram of the improved lifting mechanism in Embodiment 10 of the present invention.

FIG. 15 shows the independent installation form in the embodiment of the present invention. In this embodiment, the independent installation means that the first combined arm 10a and the second combined arm 10b are relatively independent and are connected only by a moving member 26 at the bottom. Two driving members 30 can be provided for synchronous driving. With this independent installation form, the first combined arm 10a and the second combined arm 10b are synchronously driven, which can make the two-cross-arm assemblies 10 receive force synchronously to realize more reliable driving effect. Of course, it should be pointed out here that FIG. 15 only shows an exemplary installation method, and those skilled in the art can also combine the above three installation methods according to needs to form a desired form and structure, which will not be repeated here. Of course, it should also be pointed out here that the connection form of the driving member 30 shown in FIG. 15, that is, the driving member 30 is connected at one end to the second rotational connection assembly 23 and at the other end to the first support member 11 or the second support member 12, is also within the protection scope of the present invention.

Embodiment 10

Figure 17:
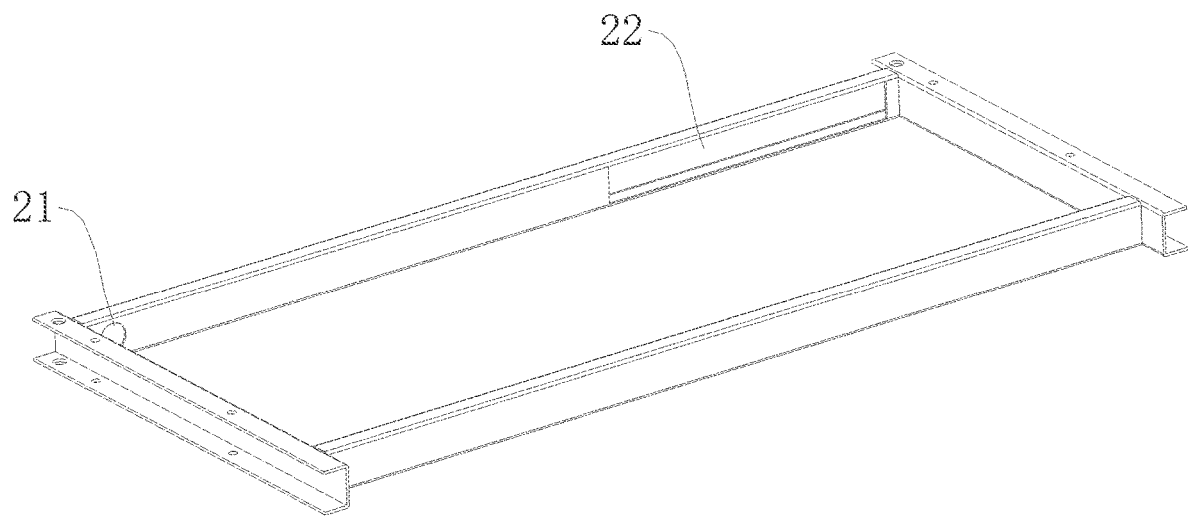
FIG. 17 is a schematic structural view of the frame at the bottom of the lifting mechanism in Embodiment 10 of the present invention.
Figure 18:
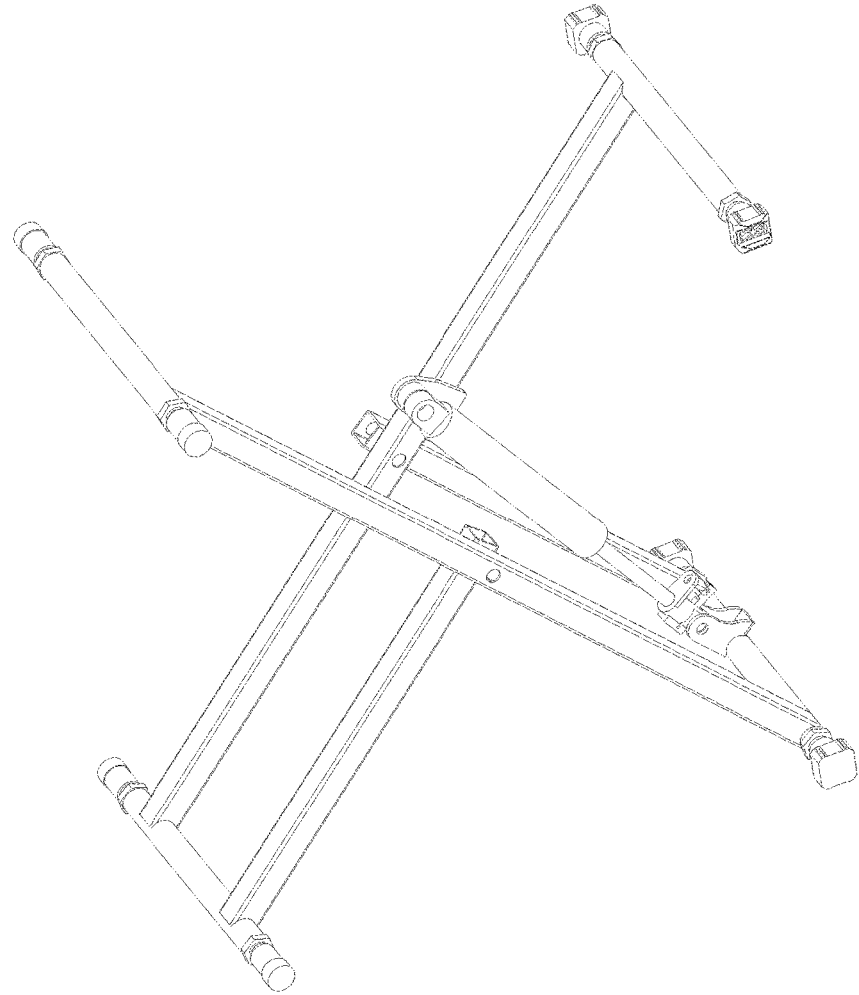
FIG. 18 is a schematic structural diagram of the cross-arm assembly in the Embodiment 10 of the present invention.

In this embodiment of the present invention, improvements have been made to the support connection assembly 20. Continuing with reference to FIG. 15, in addition to the first rotational connection assembly 21, the first sliding connection assembly 22, the second rotational connection assembly 23, and the second sliding connection assembly 24, the bottom of the support connection assembly 20 typically requires a support frame to fix the first rotational connection assembly 21 and the first sliding connection assembly 22. In order to achieve this fixed structure, it is necessary to connect the cross-arm assembly 10 to the first rotational connection assembly 21 and the first sliding connection assembly 22, and then connect the first rotational connection assembly 21 and the first sliding connection assembly 22 to the frame. In this embodiment of the present invention, such installation structure has been improved, as shown in FIGS. 16 to 19. In this embodiment of the present invention, slots for installing the four groups of support points of the cross-arm assembly 10 are directly arranged on the inner wall of the frame, as shown in FIG. 17. In this embodiment of the present invention, the support connection assembly 20 is a rectangular frame, the first rotational connection assembly 21 is a circular slot arranged on the inner wall of the rectangular frame, and the first sliding connection assembly 22 is a rectangular slot arranged on the inner wall of the rectangular frame, which rectangular slot constitutes the slide rail 25. Through this arrangement, the processing and assembly of parts are reduced, and the overall frame is more artistic. When installing the cross-arm assembly 10, as shown in the figure, the four groups of support points formed by the first combined arm 10a and the second combined arm 10b are connected through the moving member 26 or the rotating shaft, and the two ends of the rotating shaft and the moving member 26 are formed into a retractable mechanism through screw connection or snap connection. During installation, first place the cross-arm assembly 10 in the frame, and then rotate or slide it so that both ends of the moving member 26 extend into the rectangular slot, and both ends of the rotating shaft extend into the circular slot. In some embodiments of the present invention, the specific form of expansion and contraction can be that the ends of the rotating shaft 13 and the moving member 26 are connected through threads, and the ends are extended into the circular or rectangular slot by rotating the ends, and then fixed by a lock nut to achieve reliable restriction of the ends within the circular or rectangular slot. In this way, a large number of components are saved and the aesthetics of the lifting mechanism is improved, and the installation and disassembly are made easier.

Embodiment 11

Figure 19:
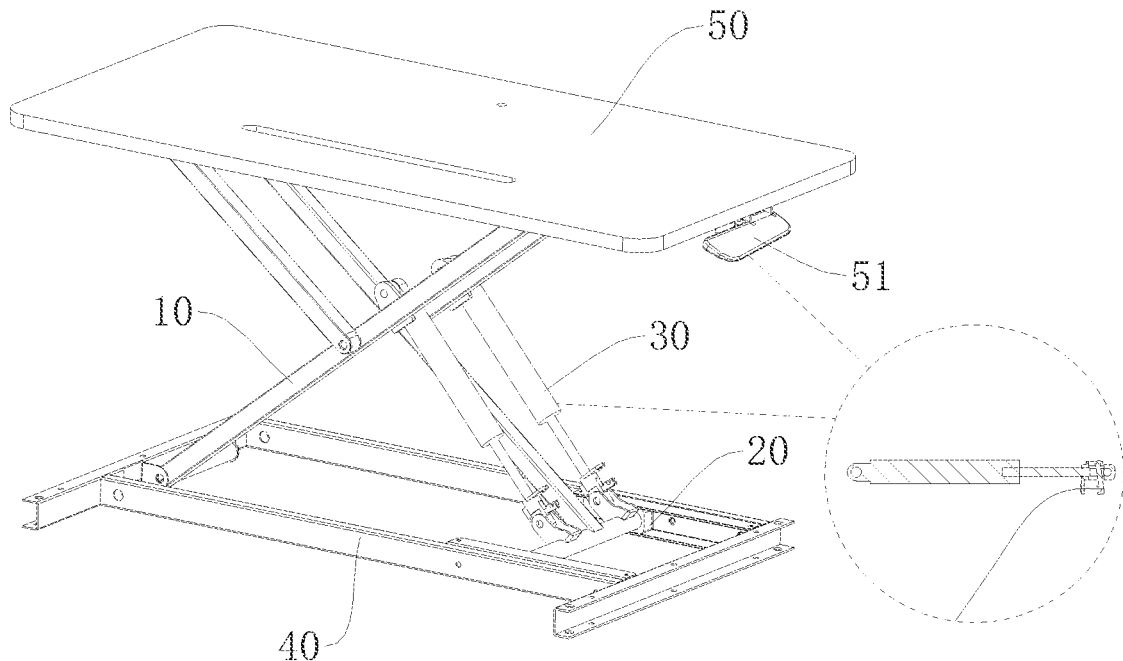
FIG. 19 is a schematic diagram of the lifting desk and its driving structure in Embodiment 11 of the present invention.

As shown in FIG. 19, based on the above-mentioned lifting mechanism, the present invention also provides a lifting desk, comprising a table top 50, a lifting mechanism, and a base 40, wherein:
   the lifting mechanism is the lifting mechanism formed by any combination of the cross-arm assembly 10, the support connection assembly 20, and the driving member 30 described above;
   the table top 50 is connected on the bottom side to the second rotational connection assembly 23 and the second sliding connection assembly of the lifting mechanism 24;
   the base 40 is connected to the first rotating connecting assembly 21 and the first sliding connecting assembly 22 of the lifting mechanism; and
   wherein the table top 50 is rotatably provided with a handle 51 on the side thereof, the handle 51 being connected to the driving member 30 for controlling the lifting mechanism. Continuing with reference to FIG. 16, in the embodiment of the present invention, the driving member 30 is selected from a gas spring, which has an ejector pin on its top end and a pressure block that can drive the ejector pin. A drive wire is connected between the pressure block and the handle 51, and the pressure block is driven by rotating the handle 51, thereby allowing the gas spring to move freely. When the handle 51 is reset, the pressure block stops pressing the ejector pin, thereby maintaining the adjusted position.

Embodiment 12

Figure 20:
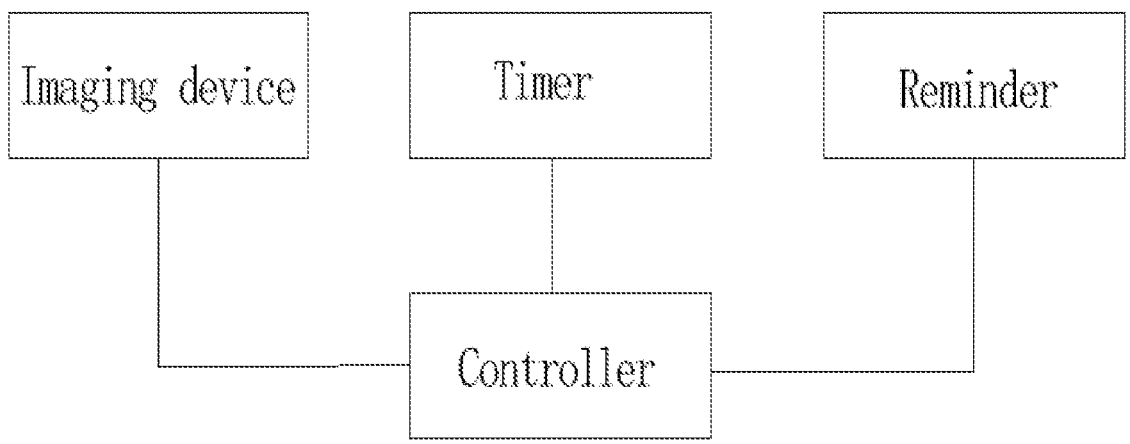
FIG. 20 is a schematic block diagram of the sedentary reminder control system in Embodiment 12 of the present invention.

On the basis of the above embodiments, the lifting desk in this embodiment also has a sedentary reminder function. As shown in FIG. 20, in the embodiment of the present invention, the table top is also provided with an imaging device, a controller electrically connected to the imaging device, and a reminder electrically connected to the controller. The reminder here may be of various forms, such as a display screen providing lighting or text reminders; or it may be a vibration reminder, which reminds the user that the user needs to stand and adjust if the user has been sitting for too long; it may also be an audible voice prompt that informs the user that the user needs to stand and adjust if they sit for too long.

The imaging device is arranged towards the standing/sitting side of the human body for capturing the posture of the human body and transmitting it to the controller, which determines whether the human body is in a sitting posture by analyzing the captured image. The posture of the user is captured by the imaging device and compared with a standard image, and is determined as a sitting posture if it matches the standard image. Alternatively, it is possible to capture the dynamics of the user from standing to sitting. If it is recognized that the body has dropped by a set amount, it indicates that the user is in a sitting state.

The controller is provided with a timer and is configured to start the timer to count when the controller determines that the human body is in the sitting posture and to control the reminder to issue a sedentary reminder when the timer reaches a set time. That is, when it is determined that the human body is in a sitting posture, the timing can start. The timing can be either a forward or a reverse timing. As long as the set time is extended, such as the sitting posture is maintained for one hour, a reminder can be issued. After receiving the reminder, the user can change the sitting posture to a standing posture by controlling the handle, which is beneficial to human health.

Embodiment 13

Figure 21:
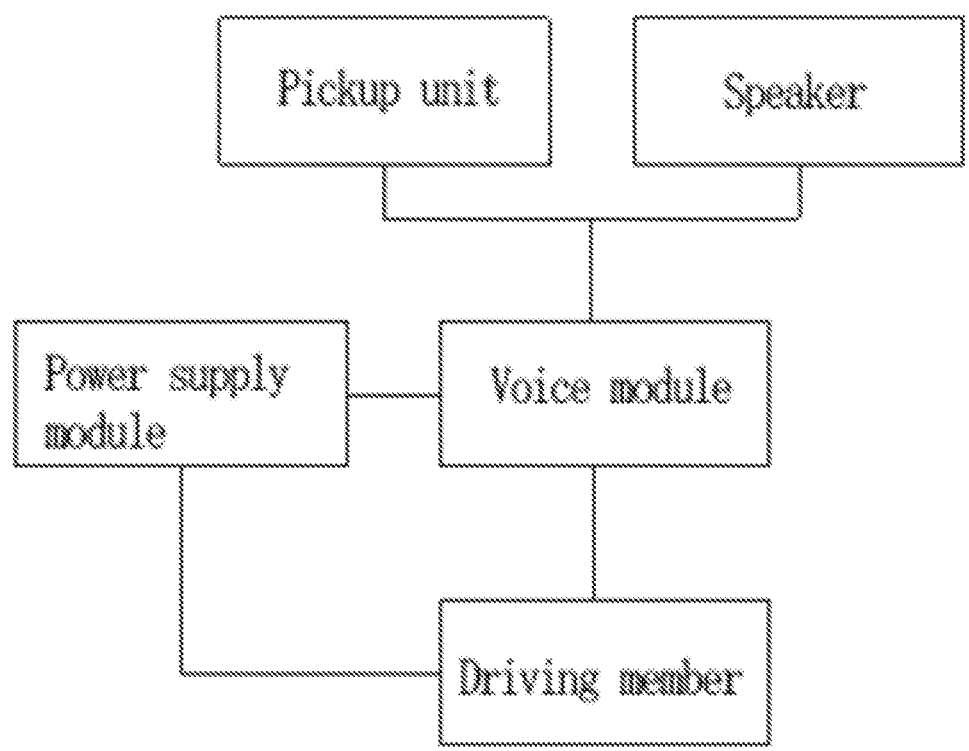
FIG. 21 is a schematic block diagram of the electronic control system in Embodiment 13 of the present invention.

On the basis of the above embodiment, an electronic control system is also provided in the embodiment of the present invention, as shown in FIG. 21, to provide other control methods besides the handle 51 described above. The table top 50 is further provided with a controller electrically connected to the driving member 30, which is electrically driven. The controller includes a voice control system and a monitoring and wake-up system. As shown in FIG. 17, the controller includes a pickup unit for receiving voice; a voice module connected to the pickup unit, configured to offer voice recognition, decoding, voice output, and control command output functions; a speaker connected to the voice module, configured to interact with users and broadcast received instructions and executed instructions. The voice module is connected to the driving member 30 to drive the driving member. In addition, a power supply module is also provided to power the driving member 30 and the controller. In this way, it is possible to achieve voice wake-up for users and control the lifting and lowering functions of the lifting desk. The specific application scenario can be as follows: the user issues a command "Jiuzheng, Jiuzheng", the controller recognizes the command and executes a wake-up function. After the speaker emits a sound of "I am here", it starts receiving voice commands in real time. After the user issues a command "raise 10 centimeters", the voice module controls the driving member 30 to execute the corresponding command and plays "10 centimeters raised" through the speaker. In this way, users' hands are freed and their experience is enriched.

In addition, in the process of automatic height adjustment, the user cannot precisely know the height to be adjusted and may need to adjust several times to extend a comfortable height. In order to facilitate adjustment, in this embodiment of the present invention, the table top 50a is provided with a pressure sensor connected to the controller on the basis of the electric drive. In the rising process of the table top 50 by voice control if the pressure received by the pressure sensor changes the drive will be stopped. In this way, during the rise of the table top 50, the drive is stopped by simply tapping the table top 50 by the operator when it rises to the right position. The operator can stand and maintain an office posture, for example, it can be a typing posture with the upper arm down and the lower arm horizontal. When the table top 50 touches the lower arm, the table top 50 will stop rising, so that the most comfortable height for standing office can be determined. In this way, the adjustment is made easier and more ergonomic. In addition, the pressure sensor can also be provided at the top of the driving member 30 for sensing the change of pressure during the rising and lowering of the table top 50. The pressure change data is reordered by the controller and the controller controls the table top 50 to stop the action when the pressure is abnormal. In this way, it is possible to prevent accidental pinching of cables, pens, or even children's fingers under the table top 50 during the rising or lowering process of the table top 50 driven by the cross arms, thereby improving the safety of the lifting desk during use. In addition, the pressure sensor can be used to add a weighing function to the table top 50. A display electrically connected to the controller can be provided on the table top 50 to display the load-bearing weight of the table top 50, which can improve the standardization of the use of the table 50 and prevent excessive objects from being placed on the table top 50 and affecting its service life. It is also possible to reset the current displayed weight through the controller, and display the weight of an item on the display when the item is placed on the table top 50.

Specifically, in the embodiment of the present invention, the driving member 30 is electrically controlled.

The pressure sensor is connected to the end of the driving member 30, and is electrically connected to the controller. The controller stores the pressure change curve of the pressure sensor during the rising and lowering process and the initial weight of items placed on the table top 50.

When the controller detects that the pressure change curve plus the initial weight exceeds the pressure curve threshold plus the initial weight during the rising process of the table 50, the controller controls the driving member to stop working.

When the controller detects an increase in pressure when the table top 50 is in a stationary state, it converts the increased pressure into mass and display the mass on the table top 50.

The pressure sensor not only improves the convenience and safety of adjustment, but also provides the additional weighing function, making the lifting desk in the embodiment of the invention applicable to more scenarios. Those skilled in the industry should understand that the present invention is not limited by the foregoing embodiments. The foregoing embodiments and descriptions only illustrate the principles of the present invention. Without departing from the spirit and scope of the present invention, the present invention will have various changes and improvements, which fall within the scope of the claimed invention. The scope of protection claimed by the present invention is defined by the appended claims and their equivalents.

The invention claimed is:

1. A lifting mechanism comprising:
a cross-arm assembly comprising a first combined arm and a second combined arm arranged in parallel, the first and second combined arms each comprising a first support member and a second support member, the length of the first support member being greater than the length of the second support member, and one end of the second support member being hinged on the first support member, the free ends of the first and second combined arms forming four groups of support points, the cross-arm assembly forming a first Y-shaped structure with a first long side and a first short side hinged together and a second Y-shaped structure with a second long side and a second short side hinged together, the first long side and the second short side being in parallel and the first short side and the second long side being in parallel;

a support connection assembly comprising a first rotational connection assembly and a first sliding connection assembly fixed to a base, and a second rotational connection assembly and a second sliding connection assembly fixed to the bottom side of a table top, the first and second sliding connection assemblies each comprising a slide rail and a moving member rotatably and slidably arranged in the slide rail, the four groups of support points formed by the free ends of the first and second combined arms being rotatably connected to the first rotational connection assembly, the second rotational connection assembly, and the two moving members, respectively; and a driving member connected to the cross-arm assembly and/or the support connection assembly for driving the moving members to change their position on the slide rail;

wherein the four groups of support points formed by the free ends of the first and second combined arms form a parallelogram, the first and second sliding connection assemblies being provided on the same side, and when the position of the moving members within the slide rail is changed, the side lengths of the parallelogram are changed to adjust the distance between the table top and the base.

2. The lifting mechanism according to claim 1, wherein the driving member is connected at one end to one of the moving members and at the other end to one of the first support members at a non-hinge point.

3. The lifting mechanism according to claim 1, wherein the driving member is connected at one end to one of the moving members and at the other end to one of the second support members at a non-hinge point.

4. The lifting mechanism according to claim 1, wherein the driving member is connected at one end to one of the moving members and at the other end to the first rotational connection assembly or the second rotational connection assembly.

5. The lifting mechanism according to claim 1, wherein the two first support members are crossed and the four free ends of the two first support members are connected to the first rotational connection assembly, the first sliding connection assembly, the second rotational connection assembly and the second sliding connection assembly, respectively; and wherein the two second support members are connected to the first rotational connection assembly and the first sliding connection assembly, respectively.

6. The lifting mechanism according to claim 1, wherein the two first support members are crossed and the four free ends of the two first support members are connected to the first rotational connection assembly, the first sliding connection assembly, the second rotational connection assembly and the second sliding connection assembly, respectively; and wherein the two second support members are connected to the second rotational connection assembly and the second sliding connection assembly, respectively.

7. The lifting mechanism according to claim 1, wherein the two first support members are crossed and the four free ends of the two first support members are connected to the first rotational connection assembly, the first sliding connection assembly, the second rotational connection assembly and the second sliding connection assembly, respectively; and wherein the two second support members are connected to the first sliding connection assembly and the second sliding connection assembly, respectively.

8. The lifting mechanism according to claim 1, wherein the support connection assembly is a rectangular frame, the first rotational connection assembly is a circular slot provided in an inner wall of the rectangular frame, the first sliding connection assembly is a rectangular slot provided in the inner wall of the rectangular frame, the rectangular slot forming the slide rail, the moving members being retractable at both ends for extending into the rectangular slot.

9. A lifting desk comprising:
a lifting mechanism according to claim 1;
a table top connected on the bottom side to the second rotational connection assembly and the second sliding connection assembly of the lifting mechanism; and
a base connected to the first rotating connecting assembly and the first sliding connecting assembly of the lifting mechanism;
wherein the table top is rotatably provided with a handle on the side thereof, the handle being connected to the driving member for controlling the lifting mechanism.

* * * * *